(12) United States Patent
Goossens et al.

(10) Patent No.: US 9,804,900 B2
(45) Date of Patent: Oct. 31, 2017

(54) MANIPULATING SHADERS WITH OBJECT-ORIENTED PROGRAMMING

(71) Applicant: APPLE INC., Cupertino, CA (US)

(72) Inventors: Thomas Goossens, Paris (FR); Amaury Balliet, Paris (FR); Aymeric Bard, Paris (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/292,645

(22) Filed: May 30, 2014

(65) Prior Publication Data

US 2015/0347199 A1 Dec. 3, 2015

(51) Int. Cl.
G06F 9/54 (2006.01)
G06F 9/45 (2006.01)
G06T 15/00 (2011.01)

(52) U.S. Cl.
CPC .............. G06F 9/541 (2013.01); G06F 8/51 (2013.01); G06T 15/005 (2013.01)

(58) Field of Classification Search
CPC .......... G06F 9/541; G06F 8/51; G06T 15/005
See application file for complete search history.

(56) References Cited

U.S. PATENT DOCUMENTS

| | | | |
|---|---|---|---|
| 6,762,757 B1 * | 7/2004 | Sander | G06T 17/20 345/420 |
| 8,010,945 B1 | 8/2011 | Kilgard et al. | |
| 8,701,081 B2 * | 4/2014 | Carrick | G06F 8/35 717/105 |
| 8,711,159 B2 | 4/2014 | Li et al. | |
| 8,970,588 B1 * | 3/2015 | Duff | 345/423 |
| 2002/0083217 A1 * | 6/2002 | Ward | G06F 9/4426 719/328 |
| 2004/0216132 A1 * | 10/2004 | Messec et al. | 719/315 |
| 2005/0114863 A1 * | 5/2005 | Williamson et al. | 719/310 |
| 2006/0098018 A1 | 5/2006 | Tarditi | |
| 2009/0122062 A1 | 5/2009 | Kilpatrick | |
| 2009/0276730 A1 * | 11/2009 | Aybes et al. | 715/825 |
| 2010/0325176 A1 * | 12/2010 | Karlsson | 707/806 |

(Continued)

FOREIGN PATENT DOCUMENTS

WO 9506298 3/1995
WO 2014015206 A1 1/2014

OTHER PUBLICATIONS

Raspe, Matthias; Lorenz, Guido; Palmer, Stephan; Hierarchical and Object-Oriented GPU Programming; CGI 2008 Conference Proceedings; University of Koblenz-Landau; 2008.

(Continued)

*Primary Examiner* — Charles E Anya
(74) *Attorney, Agent, or Firm* — Blank Rome LLP

(57) ABSTRACT

Shader manipulation via object-oriented instructions is disclosed. In various embodiments, a processor may receive object-oriented instructions. Upon receiving the object-oriented instructions, the processor may match the object-oriented instructions to uniforms of a non-object-oriented application programming interface (API) that may interface with a graphics processing unit (GPU). Further, the processor may modify the uniforms based at least in part on the received object-oriented instructions. Additionally, the processor may implements the uniforms after modification at a determined time.

23 Claims, 7 Drawing Sheets

(56) References Cited

U.S. PATENT DOCUMENTS

| | | | |
|---|---|---|---|
| 2011/0072056 A1* | 3/2011 | Bakalash | G06F 9/5044 |
| | | | 707/812 |
| 2011/0084964 A1 | 4/2011 | Gould | |
| 2011/0296438 A1* | 12/2011 | Lue-Sang et al. | 719/315 |
| 2012/0188255 A1* | 7/2012 | Brunner | G06T 15/00 |
| | | | 345/473 |
| 2012/0306877 A1* | 12/2012 | Rosasco | 345/426 |
| 2014/0098118 A1* | 4/2014 | Liu | G06F 9/45529 |
| | | | 345/522 |
| 2014/0132613 A1 | 5/2014 | Lassen et al. | |
| 2014/0168240 A1* | 6/2014 | Elmieh et al. | 345/522 |
| 2014/0354660 A1* | 12/2014 | Balci et al. | 345/522 |
| 2014/0354669 A1* | 12/2014 | Galazin | G06T 11/001 |
| | | | 345/582 |

OTHER PUBLICATIONS

Key-Value Coding Accessor Methods, Apple Computer, https://developer.apple.com/librarY/mac/documentation/Cocoa/Conceptual/KeyValueCoding/Articles/AccessorConventions.html#//apple_ref/doc/uid/20002174-BAJEAIEE, Jul. 17, 2012.

SCNProgram Class Reference, Apple Computer, https://developer.apple.com/library/Mac/documentation/SceneKit/Reference/SCNShadable_Protocol/Reference/Reference.html#//apple_ref/doc/uid/TP40014002, Oct. 12, 2013.

SCNShadable Protocol Reference, Apple Computer, https://developer.apple.com/library/Mac/documentation/SceneKit/Reference/SCNShadable_Protocol/Reference/Reference.html#//apple_ref/doc/uid/TP40014002, Apr. 9, 2014.

"Key-Value Coding Programming Guide," Jul. 17, 2012 (Jul. 17, 2012), XP055204927, Retrieved from the Internet: URL: https://developer.apple.com/library/mac/documentation/Cocoa/Conceptual/KeyValueCoding/KeyValueCoding.pdf [retrieved on Jul. 28, 2015].

Adam Martin, "OpenGL ES2—Shade Uniforms," Feb. 20, 2014 (Feb. 20, 2014), pp. 1-8, XP055205570, Retrieved from the Internet: URL: http://http://t-machine.org/index.php/2014/02/20/opengl-es2-textures-2-of-3-gl-uniforms-with-animating-textures/ [retrieved on Jul. 30, 2015].

Anonymous: "Uniform (GLSL)—OpenGL.org," May 28, 2014 (May 28, 2014), pp. 1-5, XP055205595, Retrieved from the Internet: URL: https://web.archive.org/web/20140528040233/http://www.opengl.org/wiki/Uniform_(GLSL) [retrieved on Jul 30, 2015].

Joelpryde, "joelpryde/Cinder-GlslHotProgGitHub," Jun. 14, 2012 (Jun. 14, 2012), pp. 1-1, XP055205235, Retrieved from the Internet: URL: https://github.com/joelpryde/Cinder-GlslHotProg [retrieved on Jul. 29, 2015].

Mohammad Ghabboun. "A Generic Solution for Handling OpenGL 3.1 Uniform Variables Coding Shuttle," May 13, 2013 (May 13, 2013), XP055205125, Retrieved from the Internet: URL: http://codingshuttle.com/2013/05/a-generic-solution-for-handling-opengl-3-1-uniform-variables/ [retrieved on Jul. 28, 2015].

* cited by examiner

MANIPULATING SHADERS WITH OBJECT-ORIENTED PROGRAMMING

BACKGROUND

The present disclosure relates generally to manipulating shaders described in a non-object-oriented programming language using object-oriented programming.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In application programs, imagery of the application is often manipulated using shaders. For example, an application that renders three-dimensional (3D) display images may use shaders to customize the appearance of 3D images. The shaders may be programs written using a graphics processing unit (GPU) language, such as OpenGL Shading Language (GLSL). For example, the shaders run on the GPU and may be a feature of an OpenGL application programming interface (API).

Using the OpenGL API as an example, the OpenGL API is a low-level C language API for 3D graphics. Because the OpenGL API is a low-level API, functions of the OpenGL API are often difficult to manipulate. For example, changing a functionality of a shader within the OpenGL API requires a deep understanding of the OpenGL API. However, the subject matter of the present disclosure provides a method for manipulating the shader within the OpenGL API using objective oriented programming, such as the Objective-C language.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems and methods for shader programming manipulation through object-oriented programming. An object-oriented framework is provided to enable a developer to develop shader manipulations using object-oriented code. Rather than manipulating shaders function as features of non-object-oriented application programming interfaces (API). With embodiments of the present disclosure, the developer may manipulate the shaders with object-oriented code, and the object-oriented code may map through the object-oriented framework to interact with and manipulate the non-object-oriented shading program.

Because the object-oriented framework maps the object-oriented code to the non-object-oriented API, the shaders may be manipulated by the developer without knowing the intricacies of the non-object-oriented API. Instead, the developer may learn a graphics library shading language to write object-oriented code in an object-oriented programming language of choice. As such, embodiments of this disclosure may enable access to powerful non-object-oriented programming tools that were previously unavailable to developers who did not possess an intimate knowledge of the non-object-oriented API, such as an OpenGL API.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
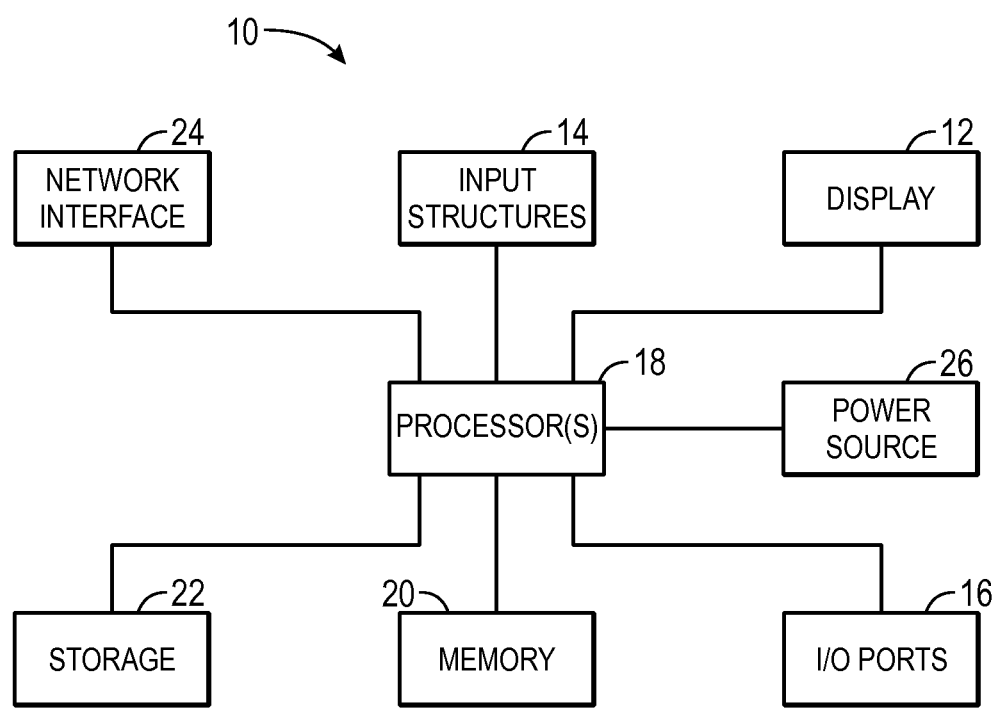
FIG. 1 is a block diagram of an electronic device that may use the techniques disclosed herein, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. It should be noted that the techniques disclosed herein may apply to any operating system, including operating systems for embedded devices (e.g., iOS by Apple Inc.) and general purpose computers (e.g., OS X® by Apple Inc.).

A developer may desire to alter shading properties of a three-dimensional (3D) image for any number of reasons, such as adjusting appropriate levels of color, size, lighting, textures, and so forth. However, shaders may be difficult to manipulate due to a very low level nature of application programming interfaces (API) featuring the shaders. That is, an API, such as an OpenGL API, supporting a shader may require a developer to have a deep understanding of the API before accomplishing manipulation of the shading program. As a result, developers of higher-level object-oriented APIs may not be able to encapsulate the power of the shaders due to a lack of access without having to intimately learn a new, deep API. This may result in applications that do not reach their full 3D graphic potential.

Accordingly, embodiments of the present disclosure relate to providing automatic mapping between the object-oriented APIs and the non-object-oriented APIs. Indeed, the present disclosure describes methods and devices that allow manipulation of shaders at an object-oriented level (e.g., an Objective-C API) instead of the non-object-oriented level (e.g., the OpenGL API). Enabling object-oriented programming for shader manipulation may enable greater access to functionalities of non-object-oriented shading languages to developers accustomed to developing programs using object-oriented APIs.

For example, a developer may use a high-level Objective-C API, such as Scene Kit™ by Apple Inc., to create applications with 3D content, such as games, for an operating system, such as iOS by Apple Inc. In the applications, the developer may alter shading of the 3D content with the Objective-C API that is automatically mapped to an OpenGL API to interact with a graphics processing unit (GPU). Further, through the Objective-C API, the developer may efficiently modify uniforms of the shader at run time without worrying about calling functions at specific moments required by the OpenGL API. In such a manner, the developer may modify the shaders of the OpenGL API without having to learn a new API or worry about the complexities of non-object-oriented coding.

Figure 2:
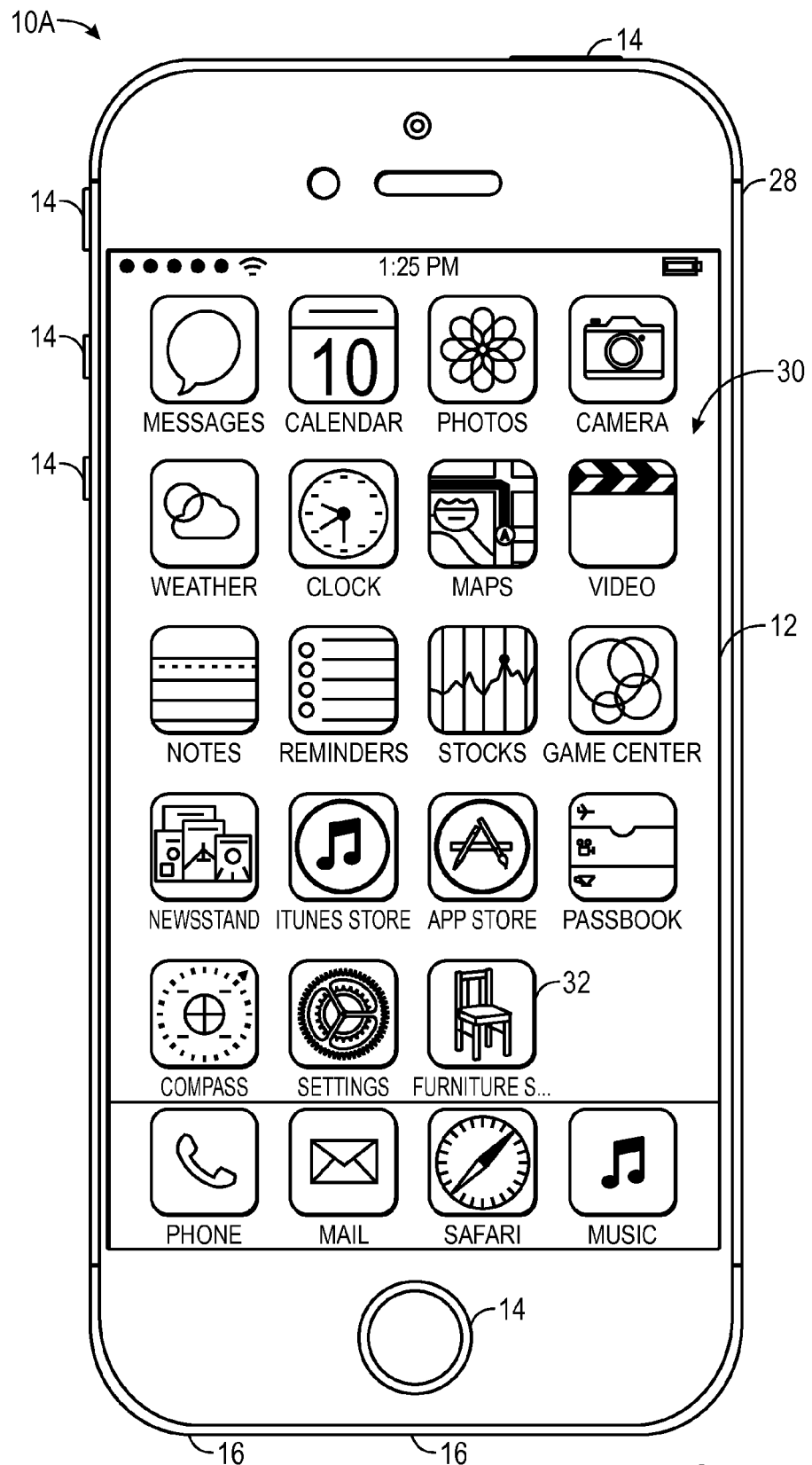
FIG. 2 is a front view of a handheld device, such as an iPhone® by Apple Inc., representing an example of the electronic device of FIG. 1.
Figure 3:
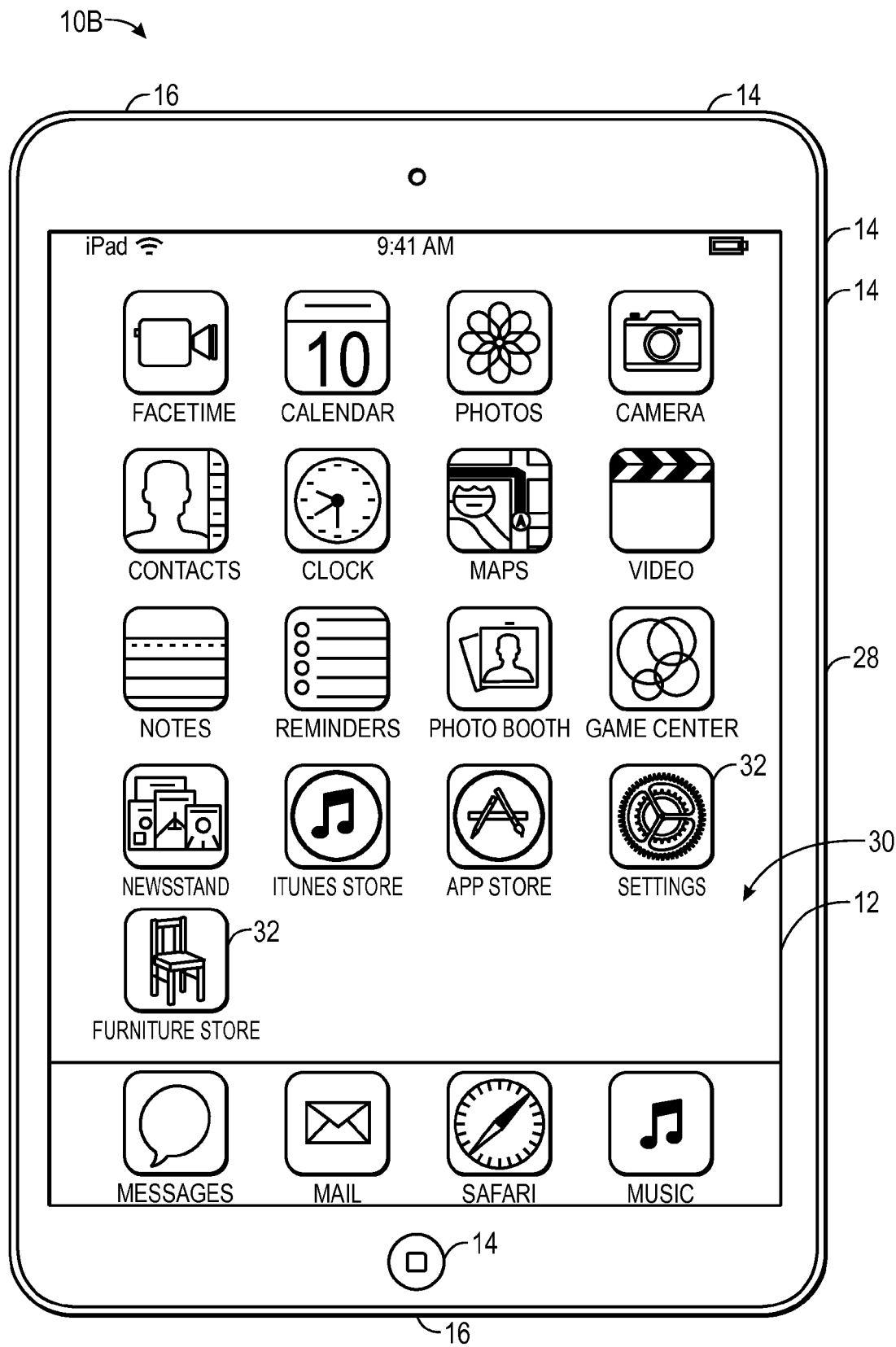
FIG. 3 is a front view of a tablet device, such as an iPad® by Apple Inc., representing an example of the electronic device of FIG. 1.
Figure 4:
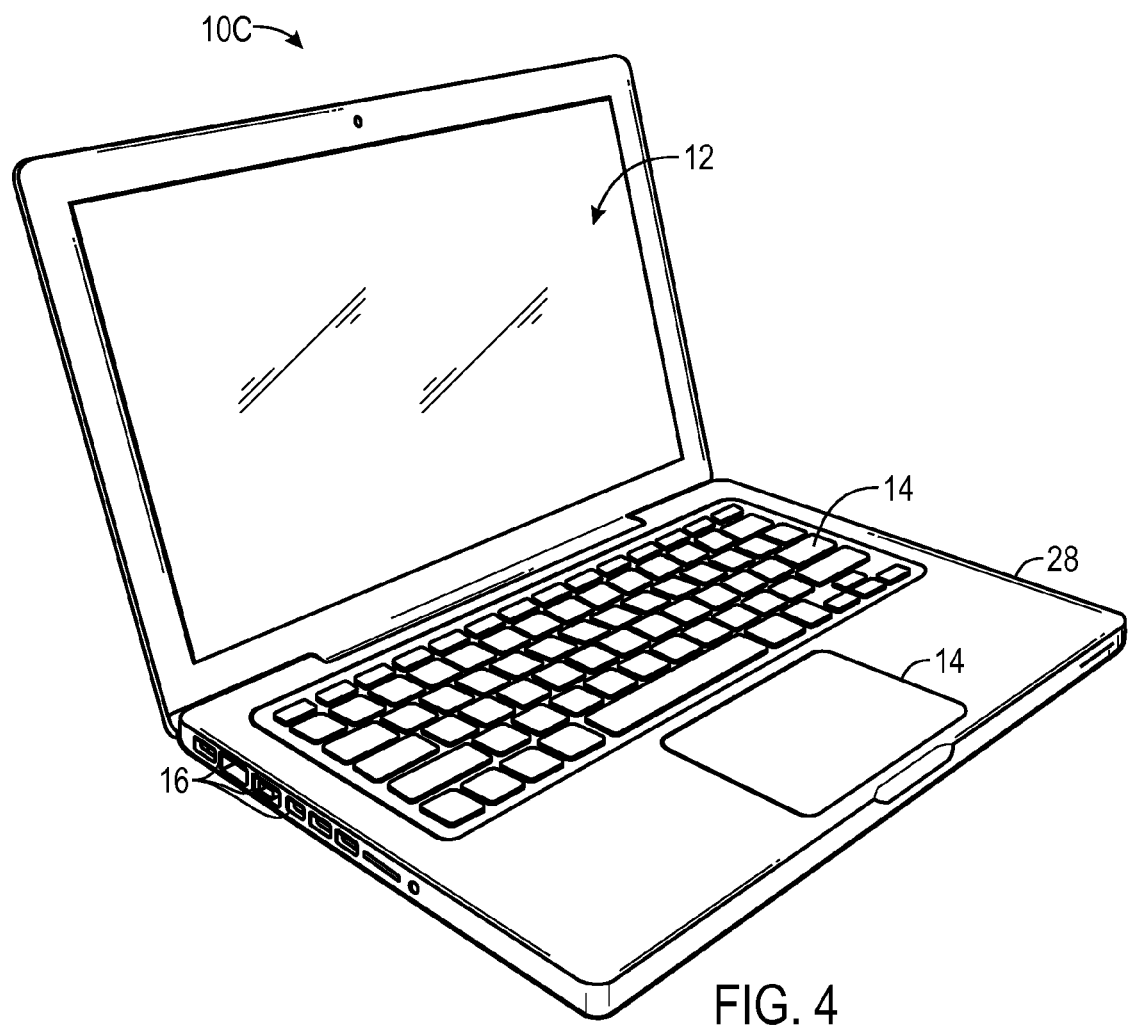
FIG. 4 is a perspective view of a notebook computer, such as a MacBook Pro® by Apple Inc., representing an example of the electronic device of FIG. 1.

A variety of suitable electronic devices may employ the techniques described herein. FIG. 1, for example, is a block diagram depicting various components that may be present in a suitable electronic device 10. FIGS. 2, 3, and 4 illustrate example embodiments of the electronic device 10, depicting a handheld electronic device, a tablet computing device, and a notebook computer, respectively.

Turning first to FIG. 1, the electronic device 10 may include, among other things, a display 12, input structures 14, input/output (I/O) ports 16, one or more processor(s) 18, memory 20, nonvolatile storage 22, a network interface 24, and a power source 26. The various functional blocks shown in FIG. 1 may include hardware elements (including circuitry), software elements (including computer code stored on a non-transitory computer-readable medium) or a combination of both hardware and software elements. It should be noted that FIG. 1 is merely one example of a particular implementation and is intended to illustrate the types of components that may be present in the electronic device 10. Indeed, the various depicted components (e.g., the processor(s) 18) may be separate components, components of a single contained module (e.g., a system-on-a-chip device), or may be incorporated wholly or partially within any of the other elements within the electronic device 10. The components depicted in FIG. 1 may be embodied wholly or in part as computer-readable instructions (e.g., software or firmware), hardware, or any combination thereof.

By way of example, the electronic device 10 may represent a block diagram of the handheld device depicted in FIG. 2, the tablet computing device depicted in FIG. 3, the notebook computer depicted in FIG. 4, or similar devices, such as desktop computers, televisions, and so forth. In the electronic device 10 of FIG. 1, the display 12 may be any suitable electronic display used to display image data (e.g., a liquid crystal display (LCD) or an organic light emitting diode (OLED) display). In some examples, the display 12 may represent one of the input structures 14, enabling users to interact with a user interface of the electronic device 10. In some embodiments, the electronic display 12 may be a MultiTouch™ display that can detect multiple touches at once. Other input structures 14 of the electronic device 10 may include buttons, keyboards, mice, trackpads, and the like. The I/O ports 16 may enable electronic device 10 to interface with various other electronic devices 10.

The processor(s) 18 and/or other data processing circuitry may execute instructions and/or operate on data stored in the memory 20 and/or nonvolatile storage 22. The memory 20 and the nonvolatile storage 22 may be any suitable articles of manufacture that include tangible, non-transitory computer-readable media to store the instructions or data, such as random-access memory, read-only memory, rewritable flash memory, hard drives, and optical discs. By way of example, a computer program product containing the instructions may include an operating system (e.g., OS X® or iOS by Apple Inc.) or an application program (e.g., Xcode, App Store, and Finder by Apple Inc.).

The network interface 24 may include, for example, one or more interfaces for a personal area network (PAN), such as a Bluetooth network, for a local area network (LAN), such as an 802.11x Wi-Fi network, and/or for a wide area network (WAN), such as a 4G or LTE cellular network. The power source 26 of the electronic device 10 may be any suitable source of energy, such as a rechargeable lithium polymer (Li-poly) battery and/or an alternating current (AC) power converter.

As mentioned above, the electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). FIG. 2 depicts a front view of a handheld device 10A, which represents one embodiment of the electronic device 10. The handheld device 10A may represent, for example, a portable phone, a media player, a personal data organizer, a handheld game platform, or any combination of such devices. By way of example, the handheld device 10A may be a model of an iPod® or iPhone® available from Apple Inc. of Cupertino, Calif.

The handheld device 10A may include an enclosure 28 to protect interior components from physical damage and to shield them from electromagnetic interference. The enclosure 28 may surround the display 12, which may display a graphical user interface (GUI) 30 having an array of icons 32. By way of example, one of the icons 32 may launch an online furniture store application. User input structures 14, in combination with the display 12, may allow a user to control the handheld device 10A. For example, the input structures 14 may activate or deactivate the handheld device 10A, navigate a user interface to a home screen, navigate a user interface to a user-configurable application screen, activate a voice-recognition feature, provide volume control, and toggle between vibrate and ring modes. Touchscreen features of the display 12 of the handheld device 10A may provide a simplified approach to controlling the presentation application program. The handheld device 10A may include I/O ports 16 that open through the enclosure 28. These I/O ports 16 may include, for example, an audio jack and/or a Lightning® port from Apple Inc. to connect to external devices. The electronic device 10 may also be a tablet device 10B, as illustrated in FIG. 3. For example, the tablet device 10B may be a model of an iPad® available from Apple Inc.

In certain embodiments, the electronic device 10 may take the form of a computer, such as a model of a MacBook®, MacBook® Pro, MacBook Air®, iMac®, Mac® mini, or Mac Pro® available from Apple Inc. By way of example, the electronic device 10, taking the form of a notebook computer 10C, is illustrated in FIG. 4 in accordance with one embodiment of the present disclosure. The depicted computer 10C may include a display 12, input structures 14, I/O ports 16, and a housing 28. In one embodiment, the input structures 14 (e.g., a keyboard and/or touchpad) may be used to interact with the computer 10C, such as to start, control, or operate a GUI or applications (e.g., Xcode, Finder, or App Store by Apple Inc.) running on the computer 10C.

Figure 5:
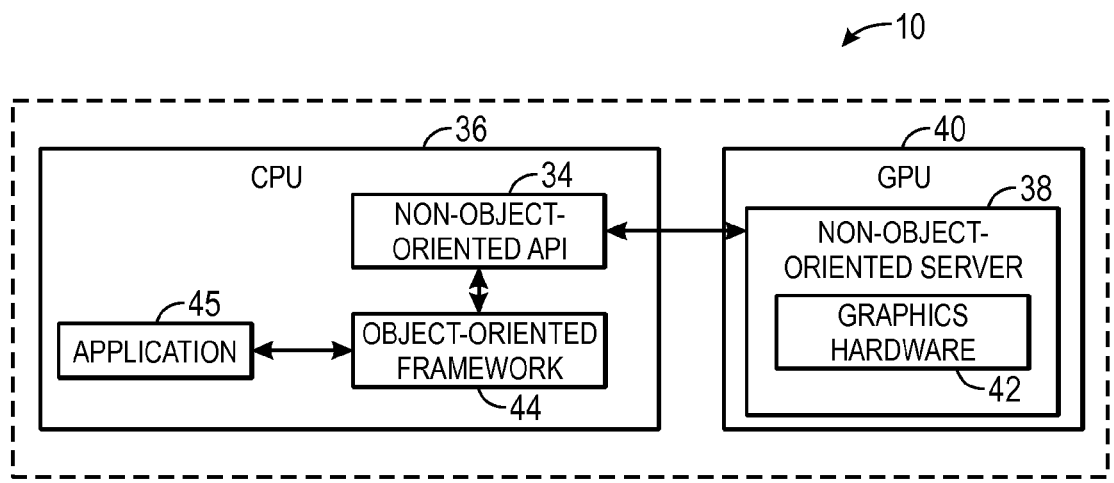
FIG. 5 is a block diagram of the electronic device of FIG. 1, in accordance with an embodiment.

With the preceding in mind, a variety of computer program products, such as applications or operating systems, may use the techniques discussed below to enhance the user experience on the electronic device 10. Indeed, any suitable computer program product that includes a viewer for previewing files, an editor for manipulating files, and/or a development environment for building applications may employ some or all of the techniques discussed below. For example, the electronic device 10 capable of running a non-object-oriented application programming interface (API) 34 on a central processing unit (CPU) 36 is illustrated in FIG. 5. Generally, a shader is written in the non-object-oriented API 34, such as an OpenGL API for a general-purpose computer or an OpenGL ES API for an embedded system. The non-object-oriented API 34 generally runs on the CPU 36 of the electronic device 10. Further, the non-object-oriented API 34 may interact with a non-object-oriented server 38 that runs on a graphics processing unit (GPU) 40. Interaction with the non-object-oriented server 38 may enable the non-object-oriented API 34 to manipulate graphics hardware 42 of the GPU 40.

With the addition of an object-oriented framework 44, such as Scene Kit by Apple Inc., the non-object-oriented API 34 may first be programmed using an object-oriented API, such as an objective-C API. Upon programming in an object-oriented language, the CPU 36 may map the object-oriented language and properties to a corresponding non-object-oriented program. In this manner, a developer may develop a shader using object-oriented instructions, have the shader mapped to the non-object-oriented API 34 via the object-oriented framework 44, and manipulate the graphics hardware 42 with the non-object-oriented API 34 via the non-object-oriented server 38.

It may be appreciated that in some instances, the developer may provide more than one set of the object-oriented instructions to the CPU 36. In such a situation, each set of the object-oriented instructions may contain a single property that maps to a single uniform of the non-object-oriented API 34, or each set of object-oriented instructions may contain a set of properties to achieve a specific effect that maps to a set of uniforms of the non-object-oriented API 34. In this manner, the developer may further customize the shader using individual sets of object-oriented instructions as modifying building blocks.

Additionally, in some instances, a technique may combine effects of multiple shaders on various 3D objects. Each effect is created by referencing a source file that contains a shader. The technique may expose all of the uniforms declared by all of the shaders that are included in the technique via the object-oriented framework 44. The technique may represent a broad spectrum of effects that a combination of multiple shaders may create. Exposing all of the uniforms declared by all of the shaders may enable a user to manipulate the broad spectrum of effects using object-oriented instructions to map manipulations to a corresponding non-object oriented shader uniform.

Further, by implementing the object-oriented framework 44 to manipulate shaders, this task is not limited to non-object-oriented programming, such as OpenGL Shading Language (GLSL). Indeed, the methods described herein enable developers to realize the power of the OpenGL while programming in a familiar object-oriented language. Instead of learning complexities of the non-object-oriented API 34, the developers may learn to manipulate shaders in an object-oriented language and rely on the object-oriented framework 44 to extract information from the shaders and synthesize code for use to manipulate code in the non-object-oriented API 34.

Once the shader is developed or manipulated at the non-object-oriented API 34, and the non-object-oriented code interacts with the GPU 40 to manipulate the graphics hardware 42, the CPU 36 may run an application 45. The application 45 may display effects created by the shader on a display of the electronic device 10. Further, the CPU 36 may implement the properties developed with the object-oriented API in the non-object-oriented code at run time of the application.

Figure 6:
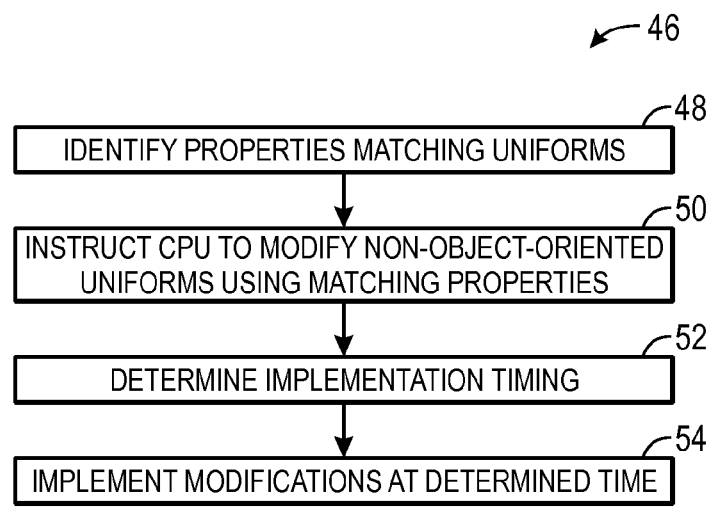
FIG. 6 is a flowchart of a method for manipulating non-object-oriented code with object-oriented code, in accordance with an embodiment.

As 3D application development grows with the growth of portable electronic devices, developing 3D graphics may become a more mainstream area of programming. Because of this growth, more developers accustomed to object-oriented programming may transition to development of 3D graphics. With this in mind, the object-oriented framework 44 may minimize a learning curve to accomplish the transition. To accomplish the synthesis of non-object-oriented code from object-oriented code, FIG. 6 illustrates a method 46 that extracts information from the object-oriented code and implements the information in the non-object-oriented code.

First, at block 48, the CPU 36 may be instructed by the object-oriented framework 44 to identify properties in the code provided by the object-oriented framework 44 and match the identified properties to uniforms of the non-object-oriented API 34. For example, the developer may wish to customize lighting of a 3D object in the application 45. A shader already running on the GPU 40 may not provide the exact effect that the developer seeks. Therefore, the developer may wish to develop object-oriented code instructing the GPU 40 to manipulate the graphics hardware 42. Upon receiving the object-oriented code, the object-oriented framework 44 may instruct the CPU 36 to identify properties declared by the developer in the object-oriented code named the same as uniforms in the non-object-oriented API 34. This may be accomplished by instructing the CPU 36 to compare the properties of the object-oriented code to uniform names of the non-object-oriented API 34 within a graphics library.

Subsequently, at block 50, the object-oriented framework 44 may instruct the CPU 36 to modify the uniforms using the matching properties from the object-oriented code. The object-oriented framework 44 may instruct the CPU 36 to synthesize a bridge between the object-oriented code and the uniforms. The bridge may enable values of the matching properties to manipulate the matching uniforms in the manner indicated by the object-oriented code. For example, the following section of code written with OpenGL Shading Language (GLSL) creates a shader for a 3D image:

```
attribute vec2 xzPos;
uniform mat4 modelViewProjectionMatrix;
uniform sampler2D heightMap;
void main( )
    {
    // Use the vertex X and Z values to look up a Y value in the texture.
    vec4 position = texture2D(heightMap, xzPos);
    // Put the X and Z values into their places in the position vector.
    position.xz = xzPos;
    // Transform the position vector from model to clip space.
    gl_Position = modelViewProjectionMatrix * position;
}
```

Instead of manipulating the uniforms of the shader using an OpenGL API, which may be complicated or difficult to write, the developer may accomplish the same result with a more elegant process using an object-oriented language. For instance, the following code creates a modifier:

```
NSString *surfaceModifier = @""
    "#pragma transparent; \n"
    "uniform float modifierAlpha = 1.0; \n"
    "_surface.diffuse.rgb *= modifierAlpha; \n"
    "_surface.diffuse.a = modifierAlpha; \n";
_teapot.shaderModifiers = @{
    SCNShaderModifierEntryPointSurface :
surfaceModifier };.
```

Instead of writing the following custom code for the OpenGL API:

```
[_teapot handleBindingOfSymbol:@"modifierAlpha"
usingBlock: (unsigned int programID, unsigned int location, SCNNode
*renderedNode, SCNRenderer *renderer) {
    CGLContextObj cgl_ctx = (CGLContextObj)[renderer context];
    CGFloat alpha = ...
    glUniform1f(location, (GLfloat)alpha);
}];
``` the following code may be written the Objective-C language to provide the same result:
    [_teapot setValue:@(alpha) forKey:@"modifierAlpha"];.

Using the Objective-C code above, the object-oriented framework 44, such as Scene Kit by Apple Inc., may instruct the CPU 36 to map the object-oriented code to non-object oriented code and to modify a uniform of the shader based on the object-oriented code at run-time. Thus, a user may customize individual uniforms from a default 3D rendering. This may enable the CPU 36 to assign any shader modifiers from the Objective-C code into the GLSL code at run time.

Further, at block 52, the object-oriented framework 44 may also instruct the CPU 36 to provide the modifications of the uniforms at appropriate times in the non-object-oriented API 34. A complicated feature of developing programs in the non-object-oriented API 34 is a timing precision requirement. In the non-object-oriented API 34, the CPU 36 may call C functions at very specific moments when a rendering pipeline is to use information from the C functions to communicate with drivers that pilot the GPU 40. Therefore, manipulating uniforms of the non-object-oriented API 34 may similarly face the timing precision requirement. With the object-oriented framework 44, the CPU 36 may determine the appropriate times for calling the C functions modified via the object-oriented framework 44. Further, at block 54, the CPU 36 may implement the modifications of the uniforms at the times determined at block 52. Furthermore, because the CPU 36 may determine the appropriate times to implement the modifications, a specific order of programming may not be essential to functionality of the object-oriented code.

Figure 7:
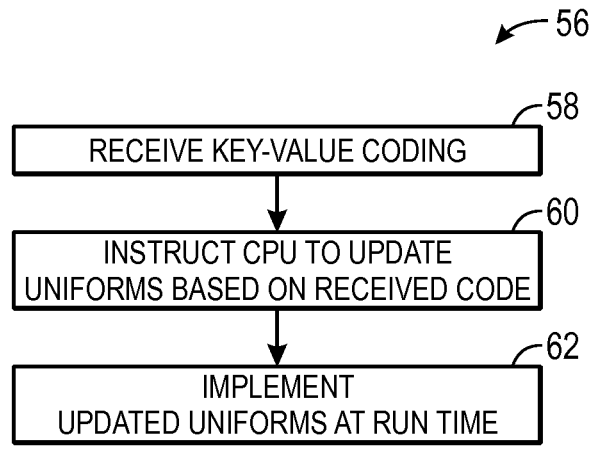
FIG. 7 is a flowchart of a method for manipulating non-object-oriented code from key-value coding, in accordance with an embodiment.
Figure 8:
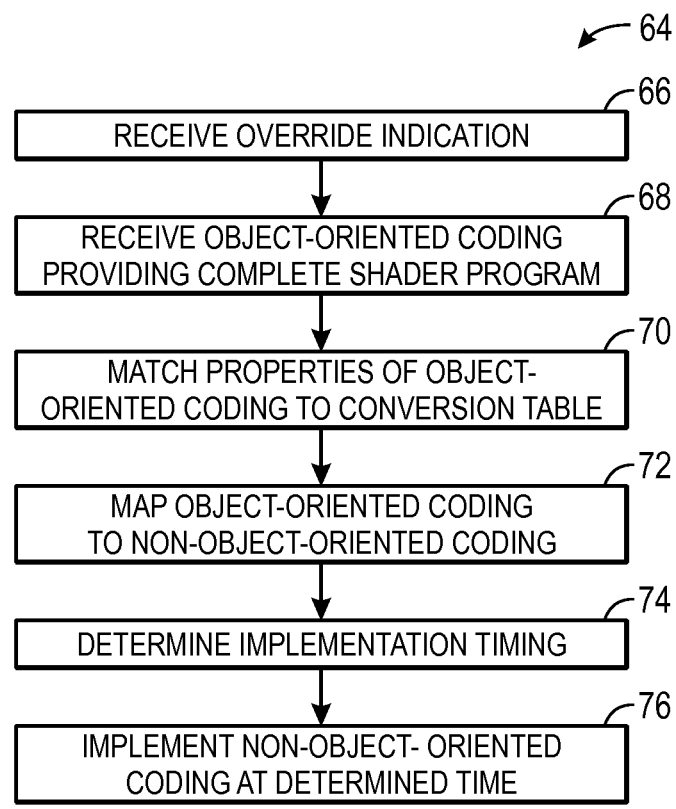
FIG. 8 is a flowchart of a method for synthesizing a shader and overriding the shader previously run on a non-object-oriented application programming interface (API), in accordance with an embodiment.

While the method 46 may offer an elegant way to modify the uniforms of the non-object-oriented API 34, FIG. 7 illustrates a method 56 to modify the uniforms using key-value coding. Key-value coding allows applications to access the uniforms indirectly by names (or keys), rather than directly through properties exposed after creation of new classes. For example, the following code accomplishes the same function as the Objective-C code above provided that a subclass declares an appropriate property:
    _teapot.modifierAlpha=alpha;.

The object-oriented framework 44, such as Scene Kit by Apple Inc., automatically converts the Objective-C properties above to their GLSL equivalent (i.e., "mat4" and "sampler2D"). With this method 46, the developer could build a user interface that controls the uniforms of the shader without writing a single line of code specifically written to manipulate the uniforms of the shader, as discussed below in greater detail in the discussion for FIGS. 9 and 10. In such an embodiment, manipulation of a graphical visualization within a graphical user interface may provide inputs to send key-value coding messages.

To accomplish the method 56, the object-oriented framework 44 must first receive the key-value coding messages at block 58. As mentioned above, a developer may use key-value coding to avoid creating new classes and to create object-oriented code that maps to the non-object-oriented API 34. The key-value coding may enable a bridge between object and non-object-oriented code that is even more streamlined than the bridge of method 46.

Once the key-value coding messages are received by the object-oriented framework 44, the object-oriented framework 44 may instruct the CPU 36 to update the uniforms of the non-object-oriented API 34 based on the received key-value coding at block 60. Updating the uniforms via instructions from the object-oriented framework 44 may amount to the bridge between the object and non-object-oriented code. As such, the bridge may enable a developer to manipulate the shader with object-oriented code while the shader is executed on the GPU 40 with the non-object-oriented code.

As mentioned above, the updated uniforms may be implemented at run time at block 62. In this manner, the non-object-oriented API 34 may update the uniforms from the key-value coding provided by the developer at block 58. The run time implementation may occur as the CPU 36 calls the uniforms. Upon the CPU 36 calling the uniforms, the object-oriented framework 44 may provide the modifications from the key-value coding to modify the uniforms at implementation.

While the methods discussed above generally concern modifications to specific uniforms in the non-object-oriented API 34, it may be appreciated that a developer may occasionally desire a more thorough rewrite of the shader. FIG. 7 illustrates a method 64 for overriding a shader of the non-object-oriented API 34. The method 64 may involve the developer rewriting the shader using an object-oriented API, and having the CPU 36 synthesize the program in the non-object-oriented API 34. The object-oriented framework 44 may provide the instructions to the CPU 36 to accomplish the synthesis of the non-object-oriented program.

Initially, at block 66, the CPU 36 may receive an indication from the developer that the developer intends to override the shader initially provided by the non-object-oriented API 34. The developer may wish to implement a shader that is completely custom to the desires of the developer. Further, the developer may wish to create such the shader using an object-oriented API. When creating the custom shader with such a robust scope, the developer may not desire any functionalities of the initial shader provided by the non-object-oriented API 34 that may interfere with the desired effects of the shader. For example, the following code written in the Objective-C language may create a new shader to replace the shader initially provided by the non-object-oriented API 34:

```
_teapot.firstMaterial.program.vertexShader = ...
_teapot.firstMaterial.program.fragmentShader =
    @"uniform vec4 color;"
     "void main( )"
     "{"
     " gl_FragColor = color;"
     "}";.
```

Additionally, the use of key-value coding may make the above sections of code even more efficient. For example, Scene Kit by Apple Inc. may allow the developer to directly manipulate uniforms with the following Objective-C code:

```
@interface CustomGeometry : SCNGeometry
@property SCNVector4 color;
@end
CustomGeometry *myCustomGeometry = ...;
myCustomGeometry.color = SCNVector4Make(1.0, 0.0, 1.0, 0.5);.
```

The following code exhibits the same functionality as the Objective-C code above, but with a more streamlined section of code without creating new classes:

```
// No custom subclass
SCNGeometry *myGeometry = ...;
[myGeometry setValue:[NSValue
valueWithSCNVector4:SCNVector4Make(1.0, 0.0, 1.0, 0.5)]
forKey:@"color"];.
```

Subsequently, the CPU 36 may receive the object-oriented coding for the custom shader that may provide a complete shading program. As discussed above, enabling the developer to develop the shader using object-oriented code may decrease a learning curve associated with writing and modifying shaders. Further, providing a way to convert the object-oriented code to non-object-oriented code capable of interacting with the GPU 40 may provide an elegant alternative to the often complex and intricate process of developing a program with the non-object-oriented API 34.

Next, the properties of the object-oriented coding may be matched to a conversion table at block 70. The CPU 36 may achieve this step by receiving instructions from the object-oriented framework 44 instructing the CPU 36 to compare the properties to the conversion table. The conversion table may include numerous uniform types that the non-object-oriented API 34 supports. In this manner, the CPU 36 may identify every uniform to include in the synthesized non-object-oriented code.

After the properties are identified at block 70, the object-oriented framework 44 may instruct the CPU 36 to map the object-oriented coding to the non-object-oriented code. In this step, the CPU 36 synthesizes the non-object-oriented code using values from the properties of the object-oriented code. The object-oriented framework 44 may provide the instructions to the CPU 36 that allow creation of the bridge between the object-oriented code and the non-object-oriented code.

At block 74, the CPU 36 determines the appropriate timing for the synthesized uniforms. As mentioned above, the non-object-oriented API 34 may rely on very specific timing sequences of the non-object-oriented code. Because of this, the CPU 36 may determine appropriate timings of the shader code prior to running the program.

Finally, at block 76, the GPU 40 executes the non-object-oriented coding with the determined timings from block 74. As the GPU 40 executes the non-object-oriented coding, the graphics hardware is modified to accomplish a desired 3D shading effect of the shader. The result may be an entirely new shader developed entirely with object-oriented code.

Figure 9:
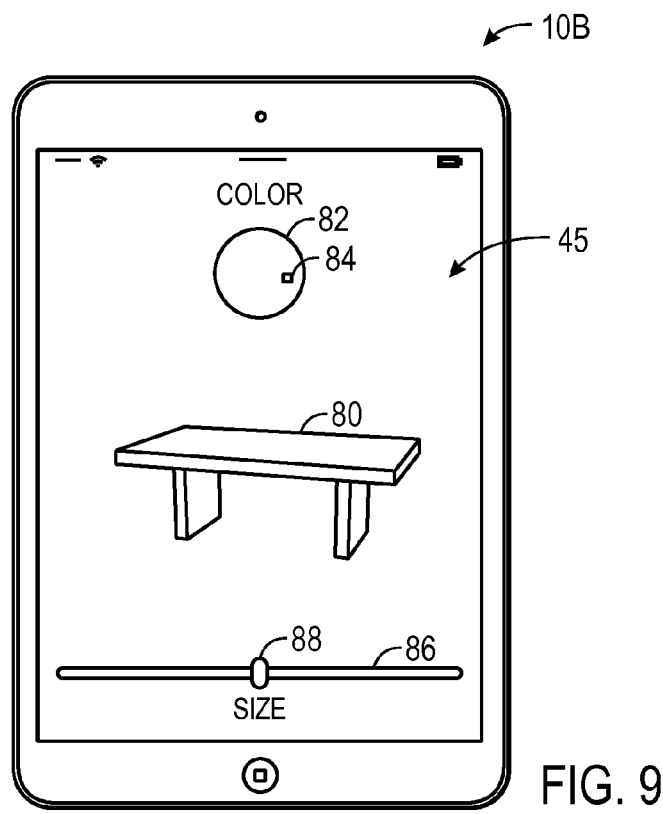
FIG. 9 is a front view of the handheld device of FIG. 2 displaying a three-dimensional (3D) application, in accordance with an embodiment.
Figure 10:
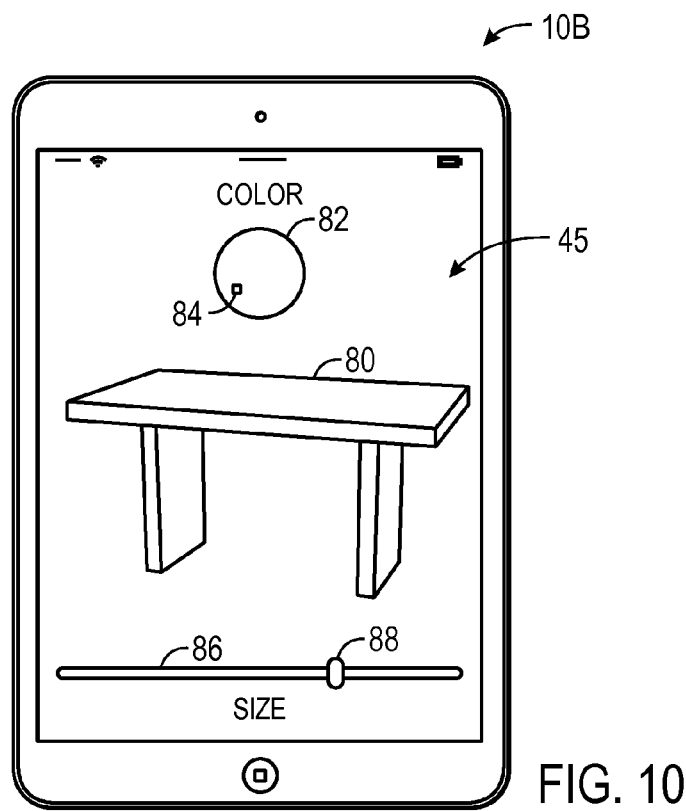
FIG. 10 is a front view of the handheld device of FIG. 2 displaying the 3D application of FIG. 9 after manipulating uniforms of the non-object-oriented API, in accordance with an embodiment.

As mentioned above, one aspect of the presently disclosed subject matter is creating an ability to develop shader manipulations using key-value coding. FIGS. 9 and 10 illustrate a visual display of the application 45 on the tablet device 10B. As discussed with regard to the method 56, manipulation of the non-object-oriented coding via the key-value coding messages may result in the ability for a developer to build a user interface that controls the shader uniforms without actually writing code specifically written to manipulate the uniforms of the shader. For example, FIG. 9 illustrates the application 45 that may represent an online furniture store. In the illustrated embodiment, a user may select a table 80 or any other furniture item that the store may sell. Upon selecting the table 80, the user may be presented with a color wheel 82, a size meter 86, or any combination thereof. The color wheel 82 may include a color selection component 84, and the size meter 86 may include a size selection bar 88. The color wheel 82 and the size meter 86 may each represent a uniform of the shader as a user interface. Moving the color selection component 84 or the size selection bar 88 may function as manipulating key value messages that correspond to uniforms in the non-object-oriented code of the shader. By moving the color selection component 84 or the size selection bar 88, the user manipulates the shader through the key-value method 56.

By way of example, FIG. 10 illustrates movement of both the color selection component 84 and the size selection bar 88. As the color selection component 84 moves around the color wheel, the key-value associated with the color selection component 84, and thus the color uniform of the shader, is manipulated. The result is a change in a color displayed on the table 80. In a similar manner, the size selection bar 88 shown with movement to the right may result in lengthening legs of the table 80. The size selection bar 88 may represent a stretching key that corresponds to a uniform related to stretching in the shader. By adjusting the key-value, the user is actively manipulating the underlying non-object-oriented API 34 by way of the object-oriented framework 44 that provides manipulation instructions to the CPU 36.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device, comprising:
    a processor;
    a graphics processing unit (GPU); and
    a memory, operatively coupled to the processor, wherein the memory is configured to store instructions that when executed by the processor cause the processor to:
       receive a plurality of object-oriented instructions for modifying at least one attribute of an image from the memory;
       map properties of the object-oriented instructions to at least one Uniform of a non-object-oriented application programming interface (API) that interacts with the GPU to construct the image;
       update the at least one attribute of the image based upon modifying the at least one Uniform according to the mapped properties of the object-oriented instructions; and
       automatically call the object-oriented instructions based on specific time requirements for communicating with drivers that pilot the GPU when the non-object oriented API is to use information from the object-oriented instructions.

2. The electronic device of claim 1, wherein the memory is further configured to store instructions that when executed cause the processor to map properties of the object-oriented instructions to the at least one Uniform by comparing the properties of the object-oriented instructions to the names of the at least one Uniform within a graphics library.

3. The electronic device of claim 1, wherein the object-oriented instructions comprise key-value coding that includes key-values that map to the at least one Uniform of the non-object-oriented API, and wherein the key-value coding modifies the at least one Uniform of the non-object-oriented API.

4. The electronic device of claim 3, wherein the key-value coding modifies the at least one Uniform during a run time of the non-object-oriented API.

5. The electronic device of claim 1, wherein the memory is further configured to store instructions that when executed cause the processor to receive an override indication prior to receiving the object-oriented instructions from the memory.

6. The electronic device of claim 1, wherein the object-oriented instructions are encoded in an Objective-C language using an object-oriented API.

7. The electronic device of claim 1, wherein the non-object-oriented API comprises an OpenGL shading language, and wherein modifying the at least one Uniform updates a shader programmed in the OpenGL shading language.

8. The electronic device of claim 1, wherein the memory is further configured to store instructions that when executed cause the processor to map properties of the object-oriented instructions to the at least one Uniform of the non-object-oriented API without executing an intermediary program code between the object-oriented instructions and the non-object-oriented API.

9. The electronic device of claim 1, wherein the processor is configured to map properties of the object-oriented instructions by comparing the properties of the object-oriented instructions to a conversion table that includes a plurality of Uniform types supported by the non-object-oriented API.

10. A non-transitory, computer readable medium having instructions stored thereon, wherein the instructions, when executed, cause a processor to:
    receive a plurality of object-oriented instructions to manipulate a plurality of Uniforms of a shader that runs on a graphic processing unit to construct an image;
    map properties of the object-oriented instructions to the Uniforms of the shader, wherein a non-object-oriented application programming interface (API) implements the Uniforms of the shader;
    update the image by manipulating the shader based at least in part on modifying the Uniforms of the shader according to the object-oriented instructions; and
    automatically call the object-oriented instructions based on specific time requirements for communicating with drivers that pilot the GPU when the non-object oriented API is to use information from the object-oriented instructions.

11. The non-transitory, computer readable medium of claim 10, wherein the object-oriented instructions are encoded as key-value coding that modifies the Uniforms of the shader indirectly using keys, names, or both.

12. The non-transitory, computer readable medium of claim 11, wherein the key-value coding instructs the processor to build a graphical user interface that controls the Uniforms of the shader via inputs from the graphical user interface.

13. The non-transitory, computer readable medium of claim 10, wherein the instructions when executed, cause the processor to manipulate the shader by overriding the shader and replacing the shader with a new shader programmed that is based at least in part on the object-oriented instructions.

14. The non-transitory, computer readable medium of claim 10, wherein the instructions, when executed, further cause the processor to compare the properties of the object-oriented instructions to a conversion table that includes a plurality of Uniform types supported by the non-object-oriented API to map properties of the object-oriented instructions to the Uniforms of the shader.

15. A method, comprising:
    receiving, using a processor, a plurality of object-oriented instructions for modifying an image;
    mapping, using the processor, the object-oriented instructions to a plurality of Uniforms of a non-object-oriented application programming interface (API) that interfaces with a graphics processing unit (GPU) to construct the image;
    modifying, using the processor, the image based upon altering the Uniforms according to the mapped object-oriented instructions; and
    automatically calling, using the processor, the object-oriented instructions based on specific time requirements for communicating with drivers that pilot the GPU when the non-object-oriented API is to use information from the object-oriented instructions.

16. The method of claim 15, wherein matching the object-oriented instructions to Uniforms of the non-objectoriented API comprises matching declared properties in the object-oriented instructions with certain names to the Uniforms of the non-object-oriented API.

17. The method of claim 15, wherein mapping the object-oriented instructions to the Uniforms further comprises comparing properties of the object-oriented instructions to a conversion table that comprises a plurality of Uniform types supported by the non-object-oriented API.

18. A non-transitory, computer readable medium having instructions stored thereon, wherein the instructions, when executed, causes the processor to:
   receive a plurality of object-oriented instructions for modifying an image;
   map the object-oriented instructions that correspond to a plurality of Uniforms of a non-object-oriented application programming interface (API) that interfaces with a graphics processing unit (GPU) to construct the image;
   apply the object-oriented instructions at run time of the non-object-oriented API such that the Uniforms of the non-object-oriented API are altered by the object-oriented instructions to construct a modified image with the GPU; and
   automatically call the object-oriented instructions based on specific time requirements for communicating with drivers that pilot the GPU when the non-object-oriented API is to use information from the object-oriented instructions.

19. The non-transitory, computer readable medium of claim 18, wherein the processor calls the object-oriented instructions based on specific time requirements for communicating with drivers that pilot the GPU regardless of a programming order of the object-oriented instructions.

20. The non-transitory, computer readable medium of claim 18, wherein the instructions, when executed further cause the processor to compare properties of the object-oriented instructions to a conversion table that includes a plurality of Uniform types supported by the non-object-oriented API to map properties of the object-oriented instructions to the Uniforms.

21. An electronic device, comprising:
   a memory;
   a display; and
   a processor configured to receive instructions and output a shaded image on the display at run time, wherein the instructions are adjustable via a graphical user interface (GUI), and wherein the instructions instruct the processor to:
   receive input from the GUI;
   convert the input from the GUI to properties of object-oriented instructions;
   map the object-oriented instructions to a plurality of Uniforms of a non-object-oriented application programming interface (API) that interacts with a graphics processing unit (GPU) to construct the shaded image;
   modify the shaded image by updating the Uniforms of the non-object-oriented API according to the mapped object-oriented instructions at run time; and
   automatically call the object-oriented instructions based on specific time requirements for communicating with drivers that pilot the GPU when the non-object-oriented API is to use information from the object-oriented instructions.

22. The electronic device of claim 21, wherein the object-oriented instructions indirectly manipulate the Uniforms of the non-object-oriented API via key values.

23. The electronic device of claim 21, wherein the input from the GUI is provided via a graphical visualization depicted on the GUI.

* * * * *

UNITED STATES PATENT AND TRADEMARK OFFICE
CERTIFICATE OF CORRECTION

| | | |
|---|---|---|
| PATENT NO. | : 9,804,900 B2 | Page 1 of 1 |
| APPLICATION NO. | : 14/292645 | |
| DATED | : October 31, 2017 | |
| INVENTOR(S) | : Thomas Goossens et al. | |

It is certified that error appears in the above-identified patent and that said Letters Patent is hereby corrected as shown below:

In the Claims

Claim 22, at Column 14, Line 30 - replace "manipulate" with -- manipulates --

Signed and Sealed this
Second Day of August, 2022

Katherine Kelly Vidal
*Director of the United States Patent and Trademark Office*